United States Patent
Barillas

(10) Patent No.: US 10,941,829 B2
(45) Date of Patent: Mar. 9, 2021

(54) DAMPER SYSTEM WITH A HIGH PERFORMANCE PLASTIC WIPER SEAL

(71) Applicant: Freudenberg-NOK General Partnership, Plymouth, MI (US)

(72) Inventor: Gonzalo Barillas, Hessen (DE)

(73) Assignee: Freudenberg-NOK General Partnership, Plymouth, MI (US)

(*) Notice: Subject to any disclaimer, the term of this patent is extended or adjusted under 35 U.S.C. 154(b) by 33 days.

(21) Appl. No.: 16/022,690

(22) Filed: Jun. 29, 2018

(65) Prior Publication Data

US 2020/0003271 A1 Jan. 2, 2020

(51) Int. Cl.
F16F 9/36 (2006.01)

(52) U.S. Cl.
CPC .................................. F16F 9/368 (2013.01)

(58) Field of Classification Search
CPC .. F16J 15/3208; F16J 15/3204; F16J 15/3232; F16J 15/32; F16J 15/65
USPC .......................... 277/436, 561, 566, 550, 549
See application file for complete search history.

(56) References Cited

U.S. PATENT DOCUMENTS

| | | |
|---|---|---|
| 2,188,855 A | 1/1940 | Chievitz |
| 2,274,234 A | 2/1942 | Ekkebus et al. |
| 2,327,837 A | 8/1943 | Williams |
| 2,770,510 A | 11/1956 | Collins |
| 2,858,150 A | 10/1958 | Neher et al. |
| 2,893,770 A | 7/1959 | Poncet |
| 2,907,596 A * | 10/1959 | Maha ..................... F16J 15/166 277/566 |
| 3,028,165 A | 4/1962 | Collins |
| 3,203,511 A | 8/1965 | Long |
| 3,215,441 A * | 11/1965 | Horvereid ................ F16J 15/32 277/437 |
| 3,829,106 A * | 8/1974 | Wheelock ............ F16J 15/3204 277/570 |

(Continued)

FOREIGN PATENT DOCUMENTS

| | | | |
|---|---|---|---|
| EP | 0050949 A1 | 5/1982 | |
| EP | 0152938 A2 * | 8/1985 | ............... F16J 15/32 |

(Continued)

OTHER PUBLICATIONS

European Search Report dated Oct. 29, 2019 (corresponding to EP 19168591.6).

(Continued)

*Primary Examiner* — Melanie Torres Williams
(74) *Attorney, Agent, or Firm* — Daniel J. Sepanik, Esq.; Harness, Dickey & Pierce, P.L.C.

(57) ABSTRACT

A damper system includes a cylinder wall defining a cylindrical chamber and having an open end having an annular recess. A piston is reciprocatingly disposed in the cylinder and is connected to a piston rod that extends out of the open end of the cylinder. An annular wiper seal is mounted in the annular recess of the cylinder and engages the piston rod. The annular wiper seal is made from a thermoplastic material. The annular wiper seal has an S-shaped cross section with a wiper lip having a lip edge that engages the piston rod, wherein the wiper lip has a substantially constant thickness along a majority of its length from the lip edge to the second radially inwardly extending portion.

4 Claims, 3 Drawing Sheets

(56) References Cited

U.S. PATENT DOCUMENTS

| | | | |
|---|---|---|---|
| 3,831,950 A * | 8/1974 | Bentley | F16J 15/3236 277/649 |
| 3,854,737 A | 12/1974 | Gilliam, Sr. | |
| 3,921,991 A | 11/1975 | Beck | |
| 4,166,523 A | 9/1979 | Fujii et al. | |
| 4,171,665 A * | 10/1979 | Stoll | F16J 15/3204 91/395 |
| 4,261,583 A * | 4/1981 | de Vries, Jr. | F16J 15/3208 277/550 |
| 4,262,915 A | 4/1981 | Williams | |
| 4,360,085 A | 11/1982 | Pendergast | |
| 4,582,330 A | 4/1986 | Lew et al. | |
| 4,602,792 A | 7/1986 | Andrick | |
| 4,611,931 A * | 9/1986 | Brandenstein | F16O 19/163 277/561 |
| 4,934,668 A | 6/1990 | Vassmer | |
| 5,165,700 A * | 11/1992 | Stoll | F16J 15/3232 277/550 |
| 5,368,312 A | 11/1994 | Voit et al. | |
| 5,482,296 A | 1/1996 | Peppiatt et al. | |
| 5,758,461 A * | 6/1998 | McManus | E02D 27/02 52/271 |
| 5,765,666 A | 6/1998 | Provence et al. | |
| 5,897,119 A * | 4/1999 | McMillen | F16J 15/3236 277/562 |
| 5,975,538 A | 11/1999 | Krause et al. | |
| 6,325,383 B1 | 12/2001 | Kahle et al. | |
| 6,572,269 B2 | 6/2003 | Yabe et al. | |
| 6,609,716 B2 | 8/2003 | Friend et al. | |
| 6,722,658 B2 | 4/2004 | Siegrist et al. | |
| 6,783,130 B2 | 8/2004 | Hashida et al. | |
| 6,896,110 B2 | 5/2005 | Vanmechelen et al. | |
| 6,942,220 B2 | 9/2005 | Takahiro et al. | |
| 7,021,633 B2 | 4/2006 | Gorman | |
| 7,172,201 B2 | 2/2007 | Uhrner | |
| 7,857,322 B2 | 12/2010 | Fietz | |
| 8,056,903 B2 | 11/2011 | Matsui et al. | |
| 8,141,881 B2 * | 3/2012 | Keck | F16J 15/322 277/438 |
| 8,387,990 B2 | 3/2013 | Castleman et al. | |
| 9,377,075 B2 * | 6/2016 | Bresso | F16F 9/362 |
| 9,951,870 B2 | 4/2018 | Mueller-Niehuus et al. | |
| 2003/0122317 A1 * | 7/2003 | Andersson | F16J 15/3236 277/440 |
| 2003/0213240 A1 * | 11/2003 | Nix | B60T 11/16 60/588 |
| 2009/0014963 A1 * | 1/2009 | Fietz | F16J 15/061 277/402 |
| 2009/0267306 A1 * | 10/2009 | Eguchi | F16J 15/3236 277/562 |
| 2012/0175848 A1 | 7/2012 | Leonard et al. | |
| 2016/0169391 A1 | 6/2016 | Emig et al. | |

FOREIGN PATENT DOCUMENTS

| | | | |
|---|---|---|---|
| EP | 0906528 B1 * | 8/2002 | ........... F16J 15/3224 |
| EP | 1878954 A1 | 1/2008 | |
| EP | 2811199 A1 | 12/2014 | |
| GB | 2267131 A | 11/1993 | |
| WO | WO-2017195770 A1 * | 11/2017 | ............... F15B 1/24 |

OTHER PUBLICATIONS

Extended European Search Report dated Feb. 17, 2020 (corresponding to EP 19168591.6).

* cited by examiner

DAMPER SYSTEM WITH A HIGH PERFORMANCE PLASTIC WIPER SEAL

FIELD

The present disclosure relates to a high performance plastic wiper seal for use with a damper system.

BACKGROUND

This section provides background information related to the present disclosure which is not necessarily prior art.

Recently, it has become desirable to zinc plate coat vehicle shock absorbing dampers after complete assembly. There are two chemical baths for the zinc plating, one is highly acidic and one is highly basic. Current wiper seal materials do not withstand the chemicals used during the zinc plate coating process.

SUMMARY

This section provides a general summary of the disclosure, and is not a comprehensive disclosure of its full scope or all of its features.

According to a first aspect of the present disclosure, a damper system is provided including a cylinder wall defining a cylindrical chamber and having an open end having an annular recess and a retaining shoulder adjacent the annular recess. A piston is reciprocatingly disposed in the cylindrical chamber and connected to a piston rod that extends out of the open end of the cylindrical chamber. An annular wiper seal is mounted in the annular recess of the cylinder wall and engaging the piston rod. The annular wiper seal is made from a thermoplastic material and is self-retained against the retaining shoulder. The annular wiper seal has a generally S-shaped cross section that includes a mounting portion extending in an axial direction that is received in the annular recess. A first radially inwardly extending portion extends radially inward from an end of the mounting portion. An intermediate portion extends axially from an inner end of the first radially extending portion in a same direction as the mounting portion extends from an outer end of the first radially extending portion. A second radially inwardly extending portion extends radially inward from an end of the intermediate portion opposite to the first radially inwardly extending portion attaches to the intermediate portion. A wiper lip extends axially and radially inward from an inner end of the second radially inwardly extending portion. The wiper lip includes a lip edge that engages the piston rod. The wiper lip can include a substantially constant thickness along a majority of its length from the lip edge to the second radially inwardly extending portion.

According to a further aspect of the present disclosure, a damper system includes a cylinder wall defining a cylindrical chamber having an open end. A piston is reciprocatingly disposed in the cylindrical chamber and connected to a piston rod that extends out of the open end of the cylindrical chamber. A seal is mounted in the open end of the cylinder wall and includes an outboard wiper seal lip and an inboard seal lip which each engage the piston rod, the seal includes an intermediate body disposed between the outboard wiper seal lip and the inboard seal lip with the intermediate body engaging the cylinder wall and the piston rod. The outboard wiper seal lip, the inboard seal lip and the intermediate body each being integrally made from a thermoplastic material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
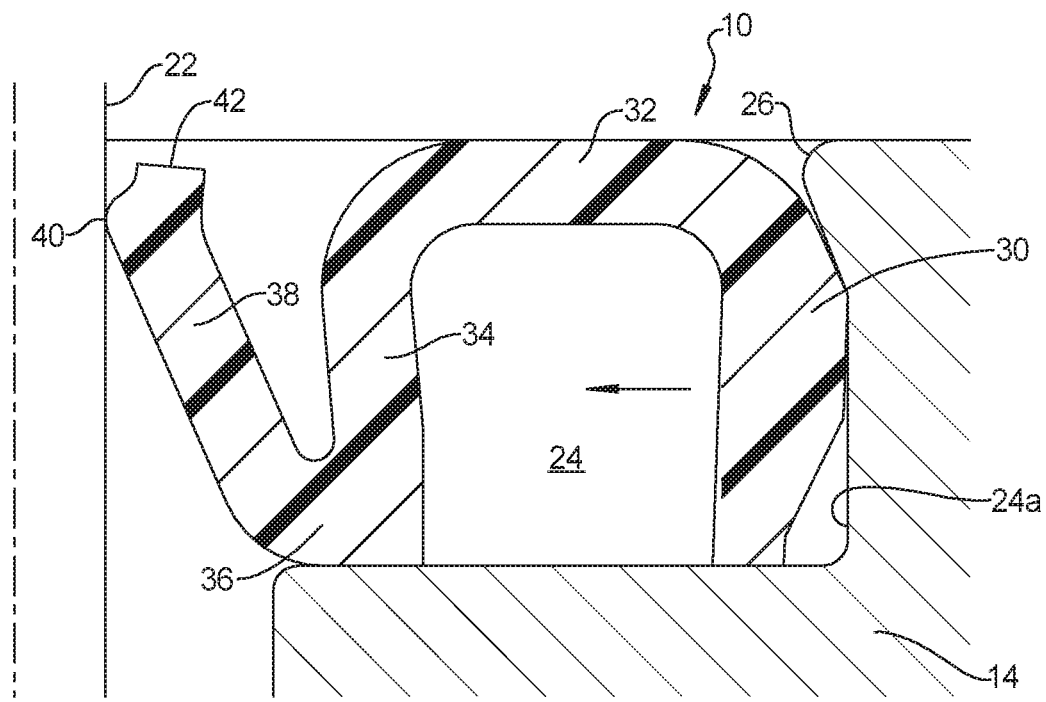
FIG. 1 is a partial cross-sectional view of a damper system having a wiper seal according to the principles of the present disclosure shown in an assembled condition between a cylinder wall and a piston rod.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 4:
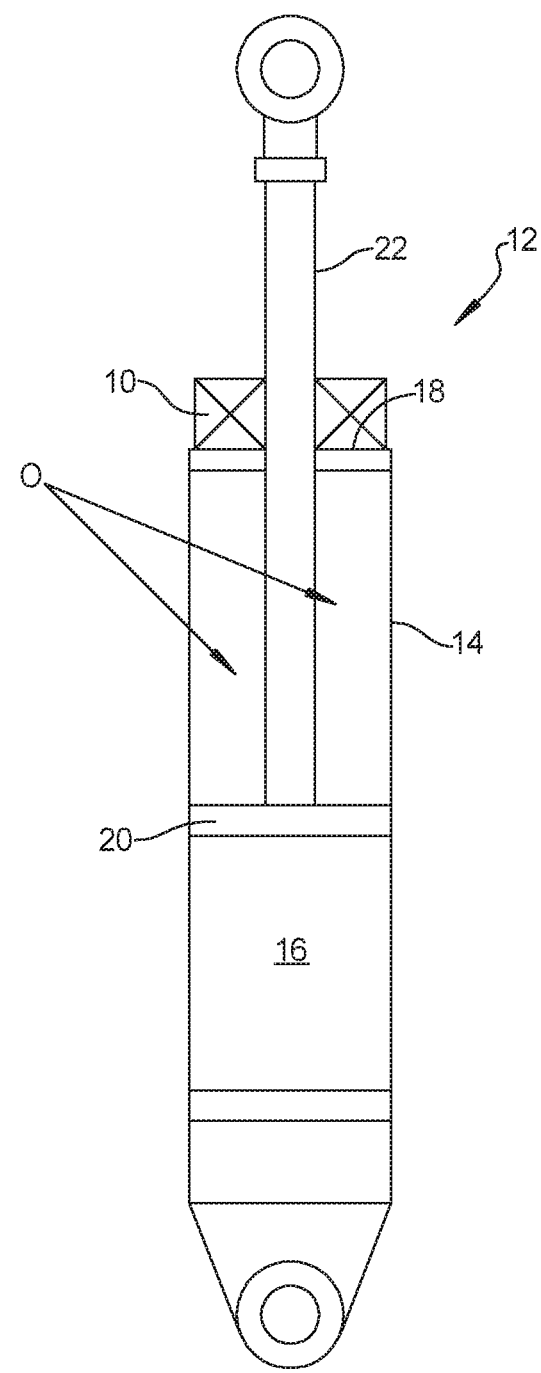
FIG. 4 is a schematic view of an exemplary damper system illustrating a mounting location of a wiper seal according to the principles of the present disclosure.

The present disclosure relates to a high-performance plastic wiper seal 10 for use with a damper 12 schematically shown in FIG. 4 and including a cylinder wall 14 defining a cylindrical chamber 16 having an open end 18. A piston 20 is disposed in the cylinder 14 and is connected to a piston rod 22 that extends through the open end 18 of the cylindrical chamber 16. The cylindrical chamber 16 can be filled with oil "O" as is known in the art. It should be understood that the seal designs 10 of the present application can be utilized with other hydraulic systems.

Figure 2:
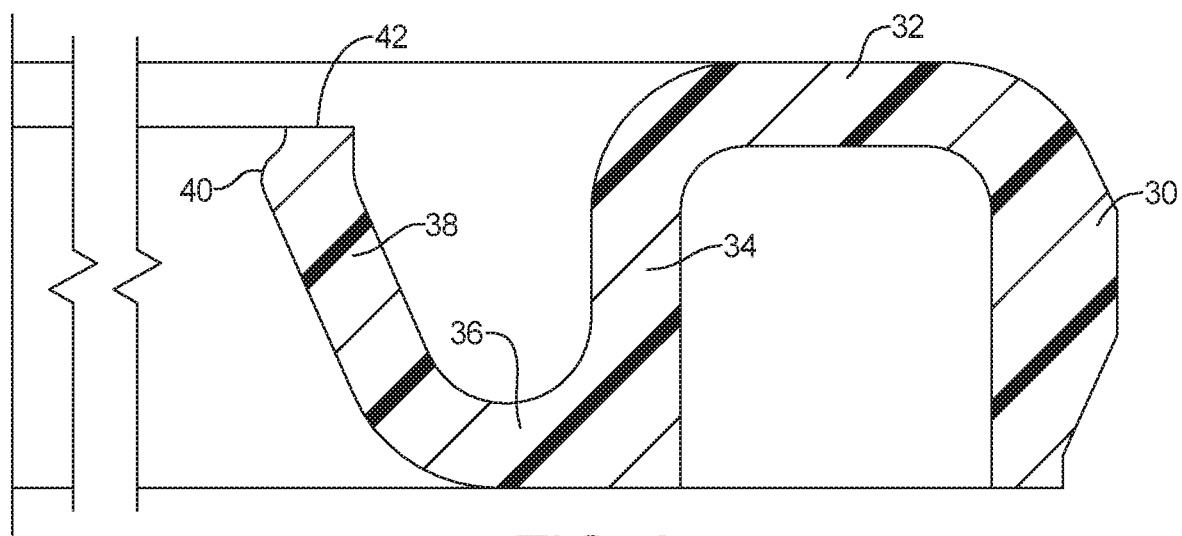
FIG. 2 is a cross-sectional view of a section of the wiper seal shown in FIG. 1 shown in an unassembled condition.

With reference to FIG. 1, the cylinder wall 14 includes an annular recess 24 and an inwardly projecting retaining shoulder 26 adjacent the annular recess 24. An annular wiper seal 10 according to a first embodiment of the present disclosure is received in the annular recess 24 and is self-retained against the retaining shoulder 26. The annular wiper seal 10 is made from a thermoplastic material such as for example polyacetal or polyketone although other thermoplastic materials may be used if they exhibit appropriate characteristics. As shown in FIGS. 1 and 2, the annular wiper seal 10 has a generally S-shaped cross-section and includes an outer mounting portion 30 extending in an axial direction and is received against an outer annular wall 24a of the annular recess 24. A first radially inwardly extending portion 32 extends radially inward from an end of the mounting portion 30. An intermediate portion 34 extends axially from an inner end of the first radially extending portion 32 in a same direction as the mounting portion 30 extends from an outer end of the first radially extending portion 32. A second radially inwardly extending portion 36 extends radially inward from an opposite end of the intermediate portion 34 opposite the first radially inwardly extending portion 32. A wiper lip 38 extends axially and radially inward from an inner end of the second radially inwardly extending portion 36. The wiper lip 38 has a lip edge 40 that engages the piston rod 22. The wiper lip 38 can have a generally constant thickness along at least a majority of its length and in particular from the lip edge 40 to the second radially inwardly extending portion 36. The lip edge 40 can be radiused and the wiper lip 38 can include a reduced thickness terminal end 42 that extends beyond and is angled radially outward relative to the lip edge 40.

Figure 3:
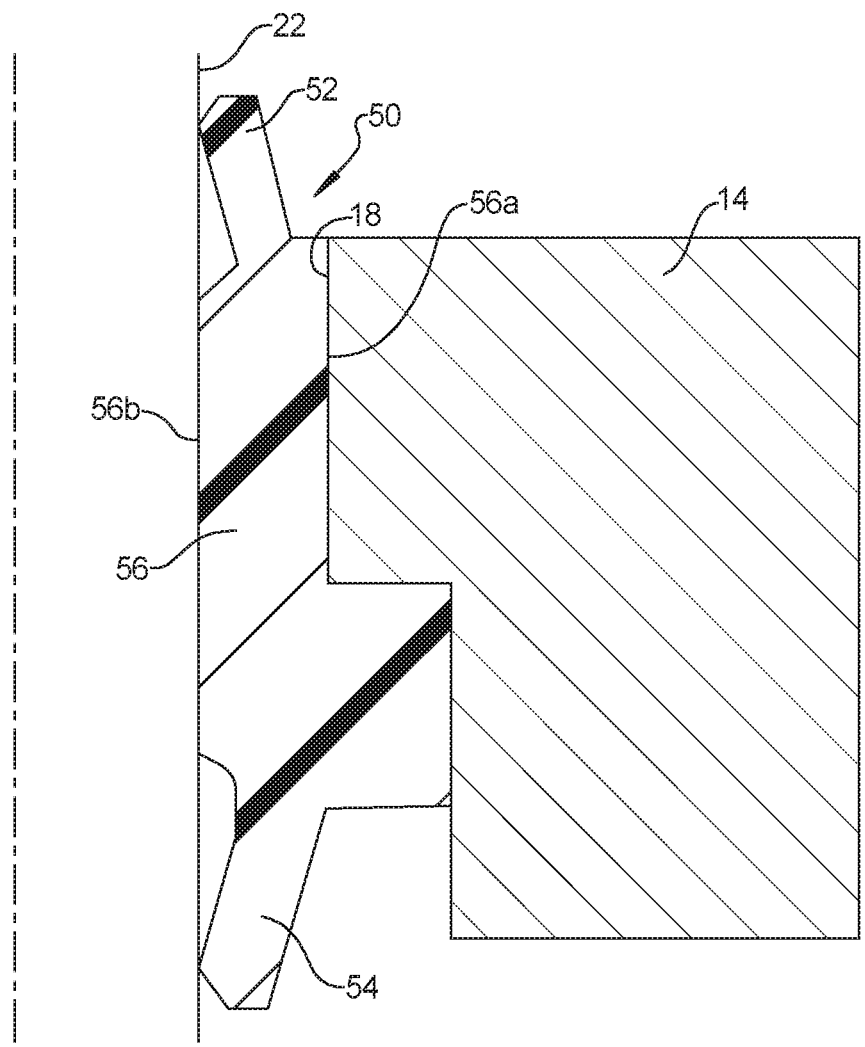
FIG. 3 is a partial cross sectional view of a damper system having a wiper seal according to a second embodiment of the present disclosure.

With reference to FIG. 3, an alternative seal 50 according to the principles of the present disclosure will now be described. The seal 50 is mounted in the open end 18 of the cylinder wall 14 and includes an outboard wiper seal lip 52 and an inboard seal lip 54 each engaging the piston rod 22. The seal 50 includes an intermediate body 56 disposed between the outboard wiper seal lip 52 and the inboard seal lip 54. The outboard wiper seal lip 52 can extend axially and radially inward from a first end of the intermediate body 56 and the inboard wiper seal 54 can extend axially and radially inward from a second end of the intermediate body 56. The connecting locations of the outboard wiper seal 52 and the inboard wiper seal 54 can be spaced radially outward from an inner surface of the intermediate body 56. The intermediate body 56 has a stepped outer surface 56a that engages the cylinder wall 14 and has an inner cylindrical surface 56b that engages the piston rod 22 to serve as a bearing surface for directing reciprocating movement of the piston rod 22. The stepped outer surface 56a retains the seal 50 in the housing 14 and enables the seal 50 to bear the pressure inside the damper. The outboard wiper seal lip 52 and the inboard seal lip 54 engage the piston rod 22 to seal the oil O within the cylindrical chamber and prevent debris from being drawn into the cylindrical chamber. The outboard wiper seal lip 52, the inboard seal lip 54 and the intermediate body 56 each being integrally made from a thermoplastic material such as for example polyketone although other thermoplastic materials may be used if they exhibit appropriate characteristics. The thermoplastic material is cable of performing both a bearing and a sealing function all combined within the integrated seal 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A damper system, comprising:
a cylinder wall defining a cylindrical chamber and having an open end having an annular recess and a retaining shoulder adjacent the annular recess;
a piston reciprocatingly disposed in the cylindrical chamber and connected to a piston rod that extends out of the open end of the cylindrical chamber;
an annular wiper seal mounted in the annular recess of the cylinder wall and engaging the piston rod, the annular wiper seal being made from a thermoplastic material and being self-retained against the retaining shoulder, the annular wiper seal having a mounting portion extending in a axial direction, a first radially inwardly extending portion extending radially inward from an end of the mounting portion, an intermediate portion extending axially from an inner end of the first radially extending portion in a same direction as the mounting portion extends from an outer end of the first radially extending portion, a second radially inwardly extending portion extending radially inward from an end of the intermediate portion opposite to the first radially inwardly extending portion attaches to the intermediate portion, and a wiper lip extending axially and radially inward from an inner end of the second radially inwardly extending portion, the wiper lip having at least one lip edge that engages the piston rod, wherein the wiper lip has a substantially constant thickness along a majority of its length from the lip edge to the second radially inwardly extending portion.

2. The damper system according to claim 1, wherein the lip edge is radiused.

3. A damper system, comprising:
a cylinder wall defining a cylindrical chamber and having an open end having an annular recess;
a piston reciprocatingly disposed in the cylinder and connected to a piston rod that extends out of the open end of the cylinder;
an annular wiper seal mounted in the annular recess of the cylinder and engaging the piston rod, the annular wiper seal being made from a thermoplastic material, the annular wiper seal having a mounting portion extending in a axial direction, a first radially inwardly extending portion extending radially inward from an end of the mounting portion, an intermediate portion extending axially from an inner end of the first radially extending portion in a same direction as the mounting portion extends from an outer end of the first radially extending portion, a second radially extending portion extending radially inward from an end of the intermediate portion opposite to the first radially inwardly extending portion attaches to the intermediate portion, and a wiper lip extending axially and radially inward from an inner end of the second radially inwardly extending portion, the wiper lip having at least one lip edge that engages the piston rod, wherein the wiper lip has a substantially constant thickness along a majority of its length from the lip edge to the second radially inwardly extending portion.

4. The damper system according to claim 3, wherein the lip edge is radiused.

* * * * *